US011140611B2

(12) United States Patent
Raval et al.

(10) Patent No.: US 11,140,611 B2
(45) Date of Patent: *Oct. 5, 2021

(54) SIM WHITELISTING AND MULTI-OPERATOR CORE NETWORKS

(71) Applicant: Parallel Wireless, Inc., Nashua, NH (US)

(72) Inventors: Kartik Shashikant Raval, Pune (IN); Rajesh Kumar Mishra, Westford, MA (US); Kaitki Agarwal, Westford, MA (US); Sridhar Donepudi, Nashua, NH (US); Pratik Mehta, Pune (IN); Yang Cao, Westford, MA (US); Steven Paul Papa, Windham, NH (US); Jitender Arora, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 139 days.

This patent is subject to a terminal disclaimer.

(21) Appl. No.: 16/691,599

(22) Filed: Nov. 21, 2019

(65) Prior Publication Data

US 2020/0092795 A1    Mar. 19, 2020

Related U.S. Application Data

(63) Continuation-in-part of application No. 16/031,670, filed on Jul. 10, 2018, which is a continuation of
(Continued)

(51) Int. Cl.
*H04W 48/02* (2009.01)
*H04W 12/06* (2021.01)
(Continued)

(52) U.S. Cl.
CPC .......... *H04W 48/02* (2013.01); *H04W 12/06* (2013.01); *H04W 84/042* (2013.01); *H04W 88/12* (2013.01)

(58) Field of Classification Search
CPC ... H04W 36/0016; H04W 36/04; H04W 4/08; H04W 64/003; H04W 76/021; H04W 8/08
See application file for complete search history.

(56) References Cited

U.S. PATENT DOCUMENTS

2007/0254666 A1* 11/2007 Dejong ................. H04W 36/14
455/436
2012/0120789 A1* 5/2012 Ramachandran .......................... H04W 36/0022
370/220
(Continued)

*Primary Examiner* — Parth Patel
*Assistant Examiner* — Berhanu D Belete
(74) *Attorney, Agent, or Firm* — Michael Y. Saji; David W. Rouille

(57) ABSTRACT

A method may be disclosed in accordance with some embodiments, comprising: receiving, at a virtualizing gateway, a first service request from a first user equipment (UE) via a first eNodeB; creating, at the virtualizing gateway, an association from each of a plurality of UE identifiers to a desired core network; applying, at the virtualizing gateway, a first filter using a first UE identifier of the first UE, based on the association; forwarding, at the virtualizing gateway, based on the applied first filter, the first service request from the first UE to the first core network; receiving, at the virtualizing gateway, via a second base station, a second service request from a second user equipment (UE); applying, at the virtualizing gateway, a second filter using a second UE identifier of the second UE, based on the association; and forwarding, at the virtualizing gateway, based on the applied second filter, the second service request from the second UE to the second core network.

16 Claims, 6 Drawing Sheets

Related U.S. Application Data application No. 15/135,535, filed on Apr. 21, 2016, now Pat. No. 10,021,623.

(60) Provisional application No. 62/150,717, filed on Apr. 21, 2015.

(51) Int. Cl.
  *H04W 88/12* (2009.01)
  *H04W 84/04* (2009.01)

(56) References Cited

U.S. PATENT DOCUMENTS

| | | | | |
|---|---|---|---|---|
| 2012/0297193 | A1* | 11/2012 | Liu | H04W 12/069 713/169 |
| 2013/0051315 | A1* | 2/2013 | Arzelier | H04W 8/06 370/328 |
| 2013/0301611 | A1* | 11/2013 | Baghel | H04W 72/04 370/331 |
| 2014/0080446 | A1* | 3/2014 | Miklos | H04L 63/1466 455/410 |
| 2014/0198640 | A1* | 7/2014 | Suzuki | H04W 48/18 370/230 |
| 2015/0078280 | A1* | 3/2015 | Lecroart | H04W 76/14 370/329 |
| 2015/0215832 | A1 | 7/2015 | Fitzpatrick | |
| 2015/0334597 | A1* | 11/2015 | Peisa | H04W 28/08 370/235 |
| 2015/0382386 | A1 | 12/2015 | Castro Castro et al. | |
| 2016/0088492 | A1* | 3/2016 | Puthenpura | H04W 16/18 455/446 |
| 2016/0128020 | A1* | 5/2016 | Agarwal | H04W 8/02 370/328 |
| 2016/0302120 | A1 | 10/2016 | Draznin et al. | |
| 2017/0188280 | A1* | 6/2017 | Watfa | H04W 36/12 |
| 2019/0364611 | A1 | 11/2019 | Centonza et al. | |
| 2020/0084711 | A1 | 3/2020 | Liu et al. | |
| 2020/0107257 | A1 | 4/2020 | Ke et al. | |

* cited by examiner

SIM WHITELISTING AND MULTI-OPERATOR CORE NETWORKS

CROSS-REFERENCE TO RELATED APPLICATIONS

This application is a continuation-in-part of, and claims the benefit of an earlier filing date under 35 U.S.C. § 120 based on, U.S. patent application Ser. No. 16/031,670, filed Jul. 10, 2018, and entitled "SIM Whitelisting and Multi-Operator Core Networks," which itself is a continuation of, and claims the benefit of an earlier filing date under 35 U.S.C. § 120 based on, U.S. patent application Ser. No. 15/135,535, filed Apr. 21, 2016, and entitled "SIM Whitelisting and Multi-Operator Core Networks," which itself claims the benefit of priority under 35 U.S.C. § 119(e) of U.S. Provisional Patent Application No. 62/150,717, filed on Apr. 21, 2015 and entitled "SIM Whitelisting and Multi-Operator Core Networks," each of which is hereby incorporated by reference in its entirety for all purposes. The present application also hereby incorporates by reference U.S. Pat. No. 8,879,416, "Heterogeneous Mesh Network and a Multi-RAT Node Used Therein," issued Nov. 4, 2014; U.S. Pat. No. 9,113,352, "Heterogeneous Self-Organizing Network for Access and Backhaul," issued Aug. 18, 2015; U.S. patent application Ser. No. 14/034,915, "Dynamic Multi-Access Wireless Network Virtualization," filed Sep. 24, 2013; U.S. patent application Ser. No. 14/643,544, "Federated X2 Gateway," filed Mar. 9, 2015; U.S. patent application Ser. No. 14/711,293, "Multi-Egress Backhaul," filed May 13, 2015; U.S. patent application Ser. No. 14/806,594, "Signaling Storm Reduction from Radio Networks," filed Jul. 22, 2015; and U.S. application Ser. No. 14/571,250, "Virtualization of the Evolved Packet Core to Create a Local EPC," filed Dec. 15, 2015, each in its entirety for all purposes.

BACKGROUND

Currently, network services are provided to mobile devices and user equipments (UEs) by a mobile network. The mobile network may authenticate the mobile devices and/or UEs using information contained in a subscriber information module (SIM) via a security server located in a core network.

SUMMARY

In a first embodiment, a method may be disclosed, comprising: receiving, at a virtualizing gateway, a first service request from a first user equipment (UE) via a first eNodeB, The virtualizing gateway may be in communication with a first core network of a first mobile operator and a second core network of a second mobile operator, the first and the second core network each including a serving gateway (SGW) and a packet data network gateway (PGW); creating, at the virtualizing gateway, an association from each of a plurality of UE identifiers to a desired core network; applying, at the virtualizing gateway, a first filter using a first UE identifier of the first UE, based on the association; forwarding, at the virtualizing gateway, based on the applied first filter, the first service request from the first UE to the first core network; receiving, at the virtualizing gateway, via a second base station, a second service request from a second user equipment (UE); applying, at the virtualizing gateway, a second filter using a second UE identifier of the second UE, based on the association; and forwarding, at the virtualizing gateway, based on the applied second filter, the second service request from the second UE to the second core network, The virtualizing gateway may be acting as a gateway between the first eNodeB and the first core network, and between the second base station and the second core network, and The second core network uses a different radio access technology (RAT) than the first core network.

The first UE identifier may be an international mobile subscriber identity (IMSI), The first filter may be a whitelist containing a plurality of IMSIs to be granted service or a blacklist containing a plurality of IMSIs to be denied service, The first service request may be a Long Term Evolution (LTE) attach request, The method further comprises forwarding a message from the first UE to a first mobility management entity (MME) in the first core network, and The second core network uses a 3G radio access technology.

The method may further comprise sending a network access stratum (NAS) message to the first UE to request an international mobile subscriber identity (IMSI) when the IMSI may be not provided by the first UE. The method may further comprise receiving a global unique temporary ID (GUTI) or a System Architecture Evolution temporary mobile subscriber identity (STMSI) from the first UE, comparing the received GUTI or S-TMSI to the plurality of UE identifiers to identify an international mobile subscriber identity (IMSI) of the first UE, and applying the first filter using the identified IMSI. The method may further comprise receiving a temporary mobile subscriber identity (TMSI), temporary logical link identity (TLLI), P-TMSI, M-TMSI, or S-TMSI from the first UE, determining an international mobile subscriber identity (IMSI) of the first UE, and determining whether to authenticate the identified first UE. The method may further comprise synchronizing a filter configuration from a configuration server to the virtualizing gateway. The method may further comprise handling sequence number breaks in a series of messages between the first UE and the first core network by restarting a message sequence.

The method may further comprise providing services to a public safety agency limited to public safety personnel with subscriber identity module (SIM) cards having IMSIs that have been configured in the first filter to permit access. The method may further comprise providing services to the first UE of a mobile subscriber roaming from the first mobile operator to a second international mobile operator and having a subscriber identity module (SIM) card for the first mobile operator, the first mobile operator having a secure route to the second international mobile operator, the second international mobile operator receiving an international mobile subscriber identity (IMSI) from the mobile subscriber's first UE, the first mobile operator forwarding a message to the second international mobile operator's core network via the secure route to the second international mobile operator, the first mobile operator performing charging and settlement services through the secure route.

The method may further comprise identifying a set of international mobile subscriber identities (IMSIs) using the first filter to be provided priority treatment of traffic. The method may further comprise identifying a set of international mobile subscriber identities (IMSIs) using the first filter to be provided an elevated level of logging and monitoring at the first core network, and sending a message to one of the first core network or the first eNodeB of the first UE to set the elevated logging and monitoring level. The method may further comprise providing services to the first UE within a corporate network at a base station connected within the corporate network; and forwarding, based on the first filter, the message from the UE via the corporate network to an operator core network to provide services to the UE from the operator core network. The method may further comprise performing per-UE throttling of service requests to the first core network. The method may further comprise blocking a rogue UE from reaching the first core network using a blacklist at the virtualizing gateway.

In a second embodiment, a system may be disclosed, comprising: a first base station for receiving messages from a first user equipment (UE); a second base station for receiving messages from a second user equipment (UE); and a gateway coupled to at least one eNodeB and acting as a virtualizing gateway for communications from at least one eNodeB to one or more core networks, the one or more core networks including a serving gateway (SGW) and a packet data network gateway (PGW), the one or more core networks having at least two radio access technologies (RATs), The virtualizing gateway further comprises: a processor; and a memory comprising instructions that, when executed by the processor, cause the processor to perform steps including: receiving, at the virtualizing gateway, a first service request from a first user equipment (UE) via the first base station; creating, at the virtualizing gateway, an association from each of a plurality of UE identifiers to a desired core network; applying, at the virtualizing gateway, a first filter using a first UE identifier of the first UE, based on the association; forwarding, at the virtualizing gateway, the first service request from the first UE to a first core network based on the applied first filter; receiving, at the virtualizing gateway, via the second base station, a second service request from a second user equipment (UE); applying, at the virtualizing gateway, a second filter using a second UE identifier of the second UE, based on the association; and forwarding, at the virtualizing gateway, the second service request from the second UE to the second core network based on the applied second filter.

In a third embodiment, a non-transitory computer-readable medium is disclosed comprising instructions that, when executed by a processor at a virtualizing gateway, cause the virtualizing gateway to: receive a first service request from a first user equipment (UE) via a first base station; create an association from each of a plurality of UE identifiers to a desired core network; apply a first filter using a first UE identifier of the first UE, based on the association; forward the first service request from the first UE to a first core network based on the applied first filter; receive via a second base station, a second service request from a second user equipment (UE); apply a second filter using a second UE identifier of the second UE, based on the association; forward the second service request from the second UE to the second core network based on the applied second filter; and act as a gateway between at least one base station and one or more core networks, The one or more core networks support at least two radio access technologies (RATs).

DETAILED DESCRIPTION

Figure 1:
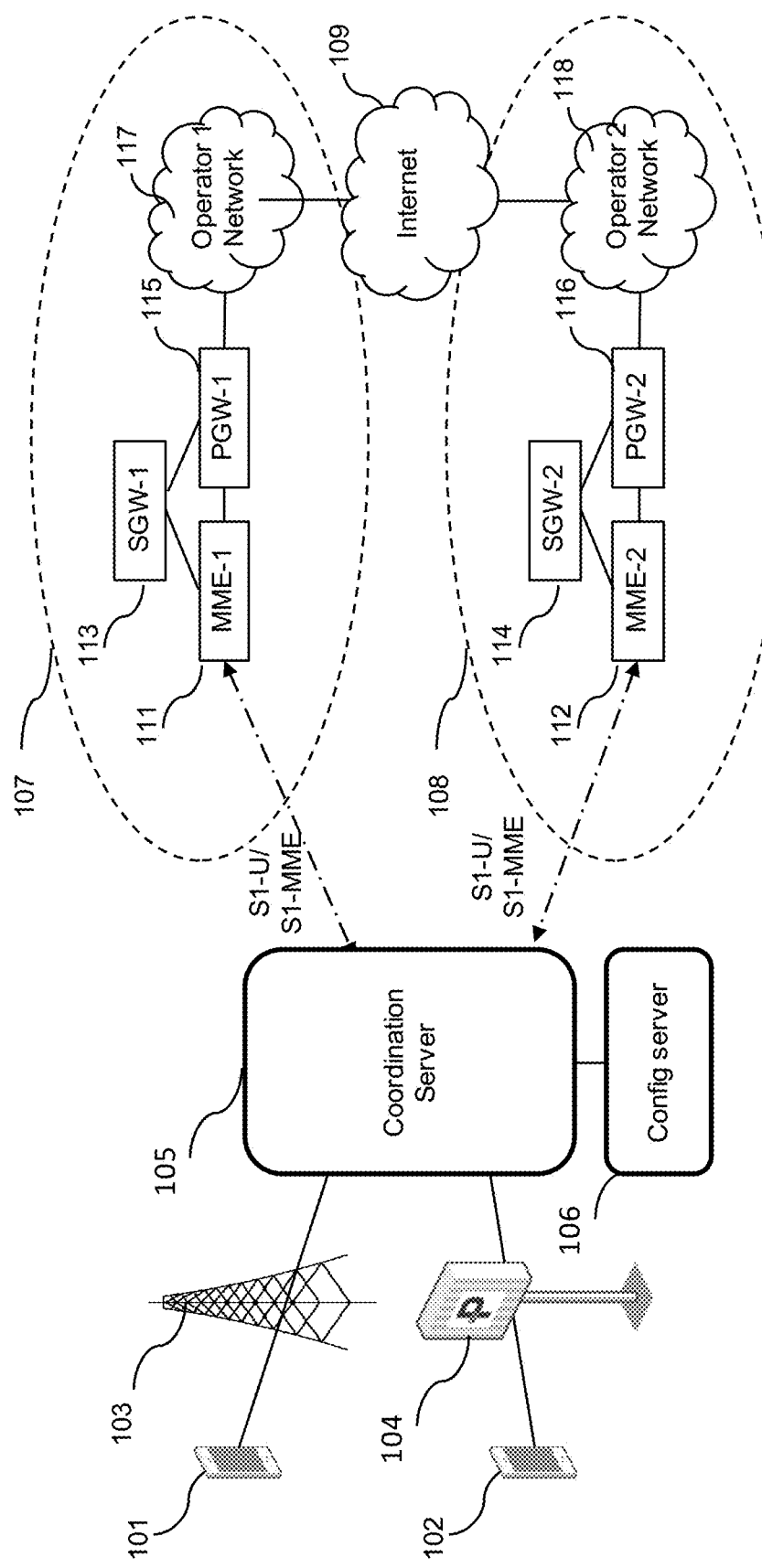
FIG. 1 depicts a network diagram of a wireless network, in accordance with some embodiments.

The modern Long Term Evolution (LTE) network is an all-IP network, with enhanced security mechanisms compared to prior 3G networks. For example, non-access stratum (NAS) signaling confidentiality, which was previously performed at the radio access network in 3G, is moved to the core network in LTE. Since there is no radio network controller (RNC) in LTE, eNodeBs in the field directly connect to the core network and hence some of the functions of the RNC are moved to the core network and/or MME. This is a sensible decision for typical LTE network deployments.

But consider the case of small cells. Small cells are likely to be more abundant and more numerous compared to traditional macro cells. These characteristics suggest that a gateway be used, such as a small cell gateway, coordinating gateway, virtualizing gateway, small cell controller, heterogeneous service access controller, a Parallel Wireless LTE Access Controller (LAC), a Parallel Wireless Heterogeneous Network Gateway (HNG), a virtualization server, and/or a cloud coordination server. This gateway, which may be referred to by the various names above, can aggregate small cells and virtualizes them such that the existing core network simply connects to a virtual macro for a number of small cells, performing some functions previously performed by the 3G radio network controller (RNC). This special gateway is referred to herein as a virtualizing gateway (VG).

Some of the functions that can be performed by a RNC based on its position in the path of the signaling can now be performed by a VG. However, NAS signaling in LTE is secured between the UE to the MME, which makes it more difficult to identify a user identify of a UE in LTE compared to in 3G, making it more difficult to intelligently provide functionality on a per-user basis. The same issue applies with LTE femto gateways. Operators that have deployed features based on user identity in 3G femto gateway may not be able to expect the same from a standard LTE femto gateway.

This text provides methods for a VG to derive a real user identity, in the form of an IMSI or other identifier, and also various features that can be based on user identity that can enhance the value proposition of a small cell controller and the network as a whole.

A virtualizing gateway acts as a virtual eNodeB to the packet core network. It is proposed that this virtual eNodeB be able to identify the user equipment latching on to the network and apply certain rules (e.g. whitelist or blacklist or so on) for the user. The VG operates as an S1 proxy, virtualizing UE connections from the MME and presenting itself as an MME to UEs that connect.

When a solution is on field trial, we want to allow only the test users to latch on to this network. We do not want other users to come in and use this test network as this network may not be able provide services to the real users as per their expectation. Although this is possible to be handled at EPC, we want to try and accomplish it at VG.

Determining User Identity

User identity based on IMSI may be used to create and enable a private PLMN, for example, for testing. In one embodiment, the following steps may occur.

1. Customer sets up a new PLMN. They may have a test PLMN for use.

2. SIM cards belong to this new PLMN, with their EPC also supporting this PLMN.

3. It is possible that this EPC also supports their regular list of PLMNs for other live subscribers (apart from test PLMN).

4. This new 'test PLMN' may not be registered on the 'equivalent PLMN list' by the MME. This list is given to all the users in attach-accept or tracking-area-accept messages.

5. There is a parameter on the SIM card—"AttachWithIMSI". This means when UE enters the area where the broadcasted PLMN is not part of its equivalent list then it will do an attach and include IMSI in the attach-request message. (In some embodiments, other parameters may be used, or IMSI may be requested or obtained later.)

6. According to GSMA recommendation, this parameter should be set to true.

7. In VG, we will have whitelist of IMSIs configured.

8. When test-PLMN specific SIM card enters the area, it can follow its regular attach/tracking area update cycle. It will include IMSI only at first power-on, and VG will pass this through to EPC.

9. When a SIM card associated with any other specific PLMN enters the area, it will not try to do automatic attachment to our network. I think it will ask user because the Test-PLMN is not part of its registered/equivalent list.

10. If user says yes for registration, it will do Attach and include its IMSI. VG will catch this and reject the attach with proper cause 'PLMN not allowed' or 'Tracking area not allowed'.

11. That UE will store this PLMN/TA in its forbidden list and may try again after reboot.

12. If the EPC only supports 'test PLMN' then it will itself reject the subscriber (instead of performing procedures for roaming).

13. If the EPC supports all types of PLMNs, then the configuration of the EPC will determine whether it will put up the 'test PLMN' out of their equivalent list. Coordination with the EPC may not be required, in certain embodiments.

3GPP TS 36.304, hereby incorporated by reference in its entirety, discusses cell status and cell reservations. In addition, 3GPP TS 24.301 and 23.003 are also hereby incorporated by reference in their entireties.

In another embodiment, to obtain the user identity, the VG may intercept the initial NAS message and generate a NAS Identity Request message towards the UE. UE will respond with its identity (IMSI) and thus VG will get to know the identity.

In some embodiments, VG will then match the identity with a white/black list and if the UE is not to be allowed, then it will generate either a NAS level response to the initiating message or terminate the call by, e.g., releasing the RRC connection if no response can be sent in the scenario.

In some embodiments, after the UE attaches for first time, it tries to use the temporary identity allocated by MME (GUTI) for subsequent NAS interaction with MME. E.g. If UE goes idle after finishing attach, when it comes back to the network, a shortened form of GUTI (i.e. S-TMSI) is provided to lower layers (S1AP) at the time of establishing NAS signaling connection. VG uses this identity of the UE to select the right MME that holds the context for the UE. VG will store this identity of the subscriber along with the permanent identity (IMSI) in its data.

In some embodiments, VG will first try to locate the subscriber using S-TMSI if available. If given S-TMSI is known and maps to an IMSI value, then VG need not query for IMSI again using NAS Identity procedure.

In some cases, GUTI reallocation can happen by signaling from the VG or MME. It can be at tracking area update or even otherwise. The new GUTI value will be told to UE on a ciphered message, so VG cannot extract GUTI out of it. This may lead to scenario where UE comes back with new S-TMSI value (derived from new GUTI) and the VG cannot identify it. VG will then go for NAS identification procedure to get to the IMSI value.

This solution requires no changes to the EPC. In some embodiments this solution may also not require changes from standard eNodeBs.

In some embodiments, a similar call flow takes place if Attach Request from UE contains GUTI in which case VG will request the IMSI and then move forward.

In another embodiment, NAS specification defines mobility management messages between UE and MME. A UE uses existing security context information to integrity protect initial NAS message while establishing the NAS signaling connection. Note that initial NAS message may not be ciphered. VG reads this initial NAS message to know the intention of the establishment, e.g. attach, type of attach, TAU or service request, etc. If VG can not derive the permanent identity by looking at the temporary identity provided in the initial NAS message, then it behaves as MME and queries the UE by sending NAS Identity Request message in clear (without integrity or ciphering protection). Note that a UE has to respond to this message in all cases by sending back NAS Identity Response. VG then stores this identity, builds a mapping between the temporary identity and the permanent identity and lets the UE communicate further directly with the MME. Further communication between UE and MME may be ciphered. Next time when the same UE establishes NAS signaling connection again, VG already knows the mapping and can derive the permanent identity based on that. Note that VG takes into consideration heuristics to determine whether the mapping between the temporary and permanent identity is reliable or unreliable. If the mapping is found to be unreliable, VG goes for the identity-procedures to query the UE again and thus rebuild the mapping.

Further Details

The following details may be provided in conjunction with one or more of the embodiments described above.

To orchestrate the call flow, in some embodiments, lookup may also be performed via S-TMSI to arrive at IMSI. However, S-TMSI can change between UE and MME without knowledge of VG, or a S-TMSI may be reallocated to a different subscriber. Thus VG's mapping of S-TMSI and IMSI may be invalid after some time. Bigger problem will happen when the same S-TMSI gets allocated to a different subscriber. Thus, in some embodiments, the VG may query IMSI from the subscriber at every call setup, or with an increased frequency over the above method.

In some embodiments, an Identity-Request can be generated by VG without any integrity protection or ciphering, but when the UE responds to it, the Identity-Response message may be integrity protected. If so, the NAS count may be incremented by the UE as it sends this message. Since the VG does not pass this message on (hiding it), the estimated NAS count at MME may in some cases go out of sync with the real value. There is provision in the specification to handle this situation until the 8 bit counter overflows. So, at boundary condition, it may happen that because of VG hiding some messages, the integrity check may start failing as MME receives messages from UE. The UE may then re-connect to the network without security protection and it should work from then on. To solve, this we may forward the Identity-Response message to MME just to get its own counter in sync, or we may send another NAS message, or we may perform another method.

In some embodiments, decoding of network access stratum (NAS) messages may be performed. A state machine can decode the initial NAS messages originated by the UE while establishing the signaling connection. UE FSM will be changed to include a state during which it will do NAS signaling with UE and fetch the IMSI value. The IMSI value will then be checked against the configured to determine if the call should be allowed or dis-allowed.

In some embodiments, this procedure will happen at almost every new call coming in to the VG because the UE gives out its IMSI only during first attach after power-on or when it hits some error condition on NAS. We can keep this procedure optional by configuration.

In some embodiments, in addition to the UE handling module, a separate system-wide task may be created that keeps track of user identities. This task will be responsible of holding all the configuration of white-list/black-list. It will also create a runtime state for each user (IMSI, S-TMSI, state, profile, etc.). All the interested client tasks (e.g. a UE handling module at VG) will query this central task to get the information and apply the same. The user-identity on this task can be created when the UE handling module at VG (a state machine) accepts the call and informs the identity. Deletion of user-identity from this task may be based on time. If we get any requirement for provisioning the IMSIs via external interface (rather than CLI), then this task can perform that, keep the details updated.

In some embodiments, configuration of the SIM whitelist/blacklist will be made available to all UE handling modules at VG. There will be no runtime state storage for the user, in some embodiments. Each UE handling module at VG will look up the user identity in the configuration. If any particular rule is provisioned then it will be applied. Note that if a user sets up a new signaling connection, it will usually provide S-TMSI value. To get to IMSI value based on S-TMSI, we need to have stored this mapping before. If the user was serviced earlier by a different UE state machine, this mapping will not be available now because a state machine for representing UE does not share any data with others. They operate independently. Hence, according to this design, a state machine will have to query the user for IMSI every time new signaling connection is established. This will involve extra signaling but it also helps to solve the case where S-TMSI could have changed and mapping stored is incorrect.

A command-line interface may be provided for this feature, and it may accommodate various embodiments. We will first define 'profiles' that will give us filters for selecting the users and rules to apply to the selected users. E.g.

```
config
   profiles
      lte
         (list) subscriber <profname>
            criteria [  [plmn mcc <x> mnc <y>] |
                        [imsi [[range <x>-<y>] | value <x>] |
                        [accessnode [name]]
            (list) rule [allow | block | monitor | trace]
config
   gateway
      operator-network <x>
         lte
            subscriber-profiles
               admin-state [enabled | disabled]
```

```
prof>    priority <num> profile <ref to previously defined
         priority <num> profile <... .>
```

FIG. 1 depicts a network diagram of an LTE wireless network, in accordance with some embodiments. The wireless network depicted shows a UE 101 attached to a macro base station 103, which is connected to a coordination server 105. Also attached is another UE 102, attached to a small cell 104, which is connected to the coordination server 105. Base stations 103 and 104 are eNodeBs. The UEs are ordinary UEs. The coordination server 105 acts as a gateway between base stations 103 and 104 and any core network, such as core network 107. Coordination server 105 is also connected to a configuration server 106, in certain embodiments. The coordination server 105 is a virtualizing gateway (VG) as described herein, and virtualizes base stations 103, 104 from the core network. For example, VG 105 is configured to act as a back-to-back user agent to virtualize signaling between the eNodeB and the core network. Certain messages may be hidden or masked, and other messages may be sent on behalf of the underlying base station.

VG 105 may be in communication with more than one core network. As shown, VG 105 is in communication with core network 107 and with core network 108. Either or both of the eNodeBs 103, 104 may be shared by one or both of core network 107 and 108. For example, base station 103 may be used exclusively by core network 107, in which case base station 103 may be represented by VG 105 as a virtual eNodeB to mobility management entity (MME) 111, serving gateway (SGW) 113, packet data network gateway (PGW) 115, and through PGW 115, operator 1 packet data network 117, together comprising certain components of core network 107. Base station 103 may also be shared by both of core networks 107 and 108, in which case core networks 107 and 108 see different, virtualized eNodeBs, and another virtualized eNodeB may be used by VG 105 to represent base station 103 to core network 108, including MME-2 112, SGW-2 114, PGW-2 116, and operator 2 network 118. Typically, packet data networks 117 and 118 of the different operators are connected via the public Internet 109. Similarly, base station 104 may be virtualized by VG 105 to core networks 107, 108, or both.

In operation, VG 105 performs SIM whitelisting and other related procedures as described herein. Ordinarily, authentication of a UE occurs at the core network. When a UE attaches to a base station, authentication credentials, in some cases including IMSI, are sent to the core network before authentication is performed. However, the ordinary method does not enable virtualization of a single base station across multiple core networks. The ordinary method also does not enable quarantining of rogue UEs before they are able to send messages to the core network and potentially cause harm to the network. In some embodiments, throttling of messages or service requests prior to the messages being sent to the core network may be performed. In some embodiments, the whitelisting or authentication may be performed at the VG 105. In some embodiments, the whitelisting or authentication may be performed by a modified eNodeB in conjunction with, or configured by, the VG 105 or the configuration server 106.

Figure 2:
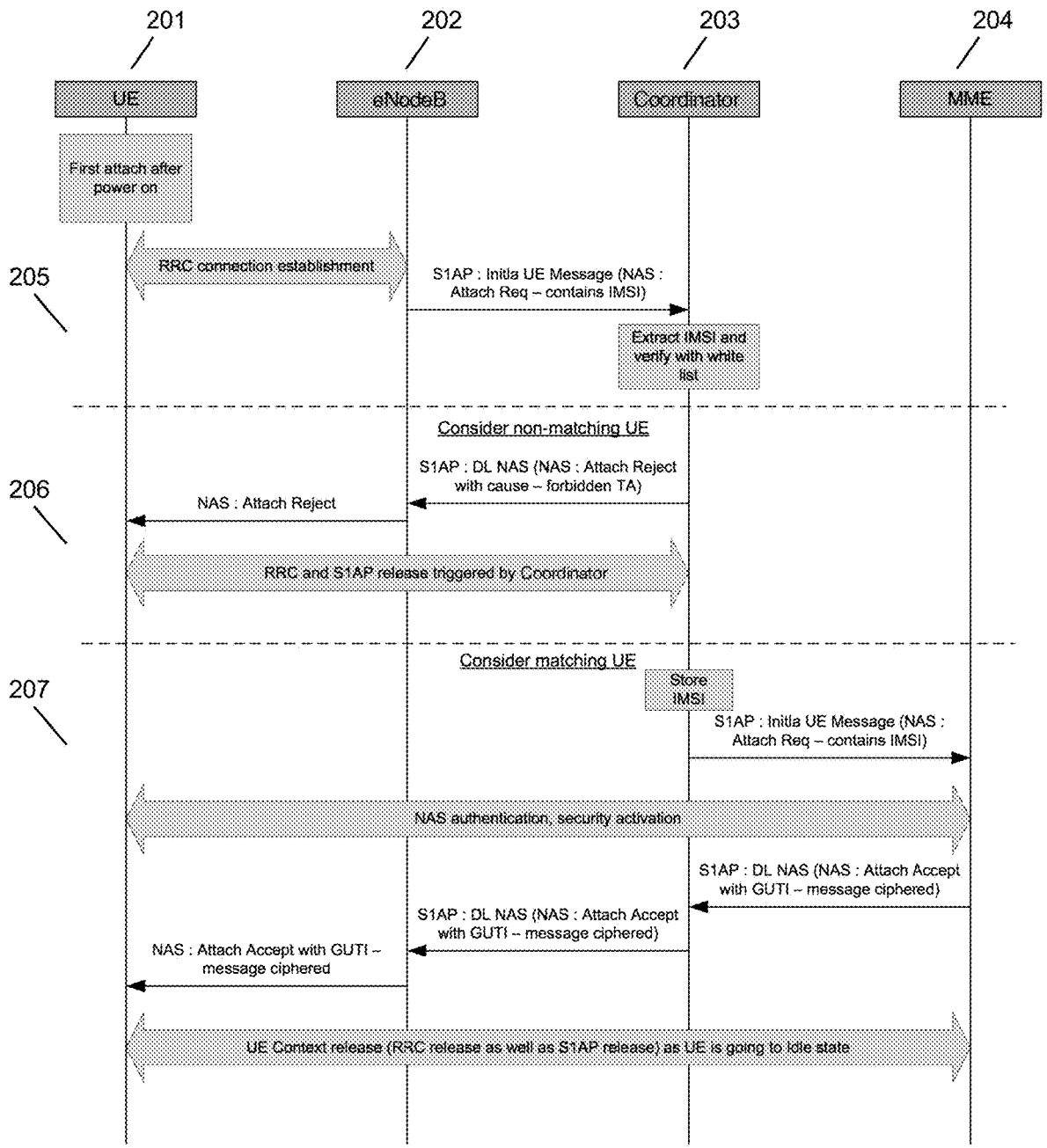
FIG. 2 is a call flow of a SIM whitelisting procedure, in accordance with some embodiments.

FIG. 2 is a call flow of a SIM whitelisting procedure, in accordance with some embodiments. UE 201 attempts to attach to eNodeB 202, which goes through a coordinator node 203 to reach MME 204. Coordinator 203 is a virtualizing gateway. Call flow 205 shows a first attach after power on. When UE 201 attempts to attach, it shares its IMSI for the first attach request after power on. This IMSI is shared with the eNodeB, which passes it along to coordinator 203, which performs matching or filtering according to a whitelist or other screening methods as described herein. For example, the UE may be determined not to be on a blacklist, or if coordinator 203 is in communication with multiple core networks, the particular core network for the UE may be identified. Matching or filtering, etc. is performed independently per each UE.

Call flow 206 shows the results of a failure of the received IMSI to match any entry on the whitelist at coordinator 203. The UE is rejected from attaching to the network before any message reaches MME 204. Call flow 207 shows the results of a successful match between the received IMSI and a whitelist. The IMSI is stored at coordinating node 203 before the original attach message is sent to MME 204, which authenticates the UE at the core network using, e.g., a visitor location register (VLR), an authentication, authorization, and accounting (AAA) server or policy charging rules function (PCRF) server. In the MME 204 returns a globally unique temporary ID (GUTI) to the UE together with the NAS attach accept message. Coordinating node 203 may take the GUTI and store it for later matching, with the GUTI being configured to map to the prior-received IMSI. Although the attach accept message may be ciphered, and all other subsequent messages may be encrypted or ciphered and only the GUTI may be exchanged, not the IMSI, the coordinating node 203 can now use the GUTI to identify the UE.

Figure 3:
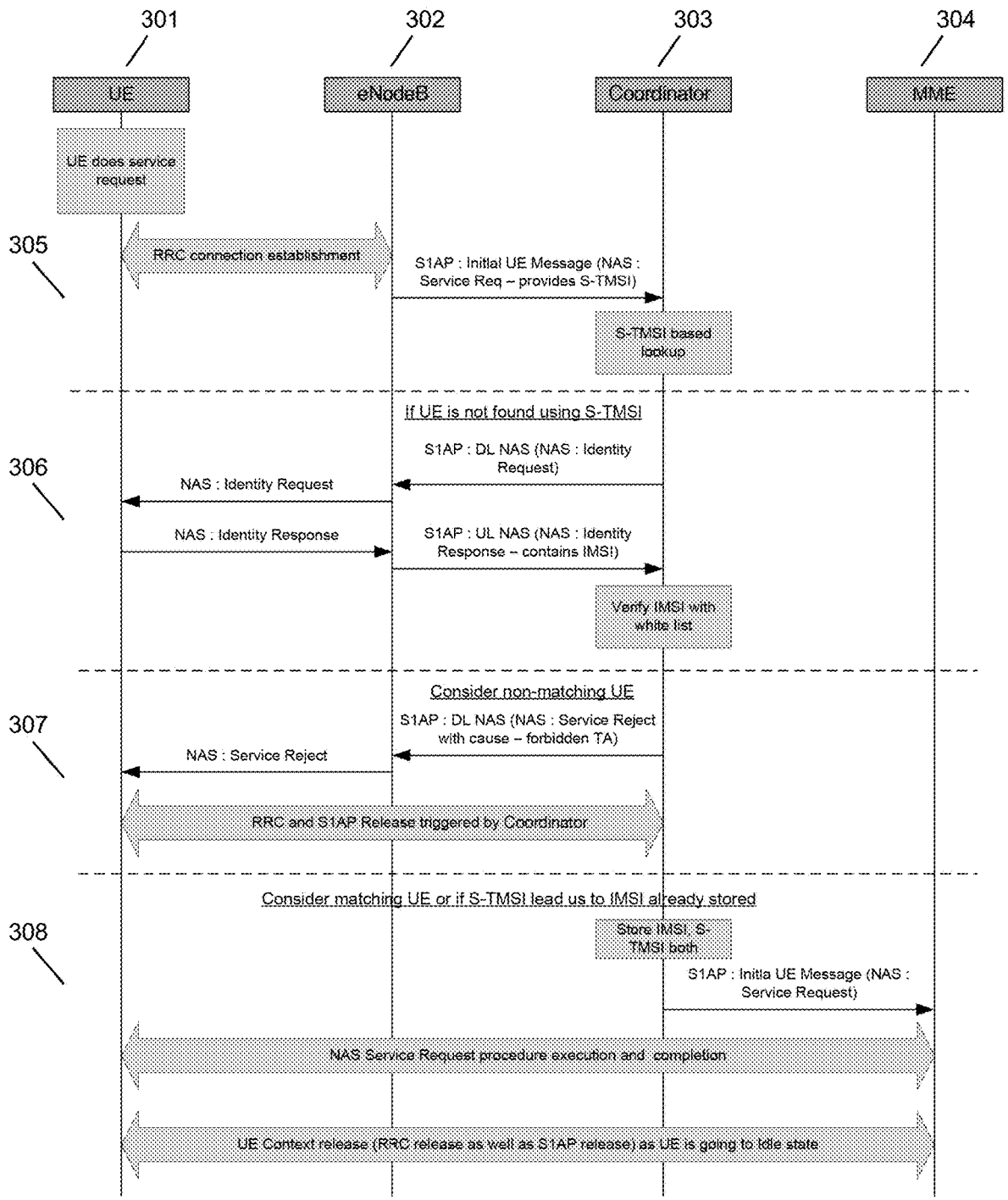
FIG. 3 is a call flow of an S-TMSI lookup procedure, in accordance with some embodiments.

FIG. 3 is a call flow of an S-TMSI lookup procedure, in accordance with some embodiments. In many cases, a UE may request to attach to a network without sharing its IMSI. For example, if a UE enters a service region of an eNodeB from another base station, it may use a GUTI or System Architecture Evolution temporary mobile subscriber identity (S-TMSI) obtained from a core network MME to request attach to the eNodeB. In FIG. 3, UE 301 requests attach to eNodeB 302. The service request does not include an IMSI. The eNodeB 302 may send the UE message along to coordinator 303, which is a virtualizing gateway. As shown in call flow 305, Coordinator 303 may not be able to use the S-TMSI to perform whitelisting or other authentication methods when the UE 301 attempts to attach to eNodeB 302, especially if the UE has not been seen by any base station connected to coordinator 303.

Call flow 306 shows the steps that occur if a record of the UE is not found at coordinator 303 with the UE's S-TMSI. Instead of forwarding the message onto MME 304, the coordinator 303 may send a network access stratum (NAS) identity request message back to the UE viai eNodeB 302, requesting the IMSI from the UE. The UE then provides the IMSI, allowing the coordinator to verify the UE's credentials.

Call flow 307 shows steps that occur if the IMSI is not authenticated by the coordinator 303, causing rejection of the service request. Call flow 308 shows steps that occur if the IMSI is authenticated by coordinator 303, causing service request acceptance. Coordinator 303 saves the IMSI and S-TMSI, and also forwards the original UE service request to MME 304, which then authorizes the UE.

Figure 4:
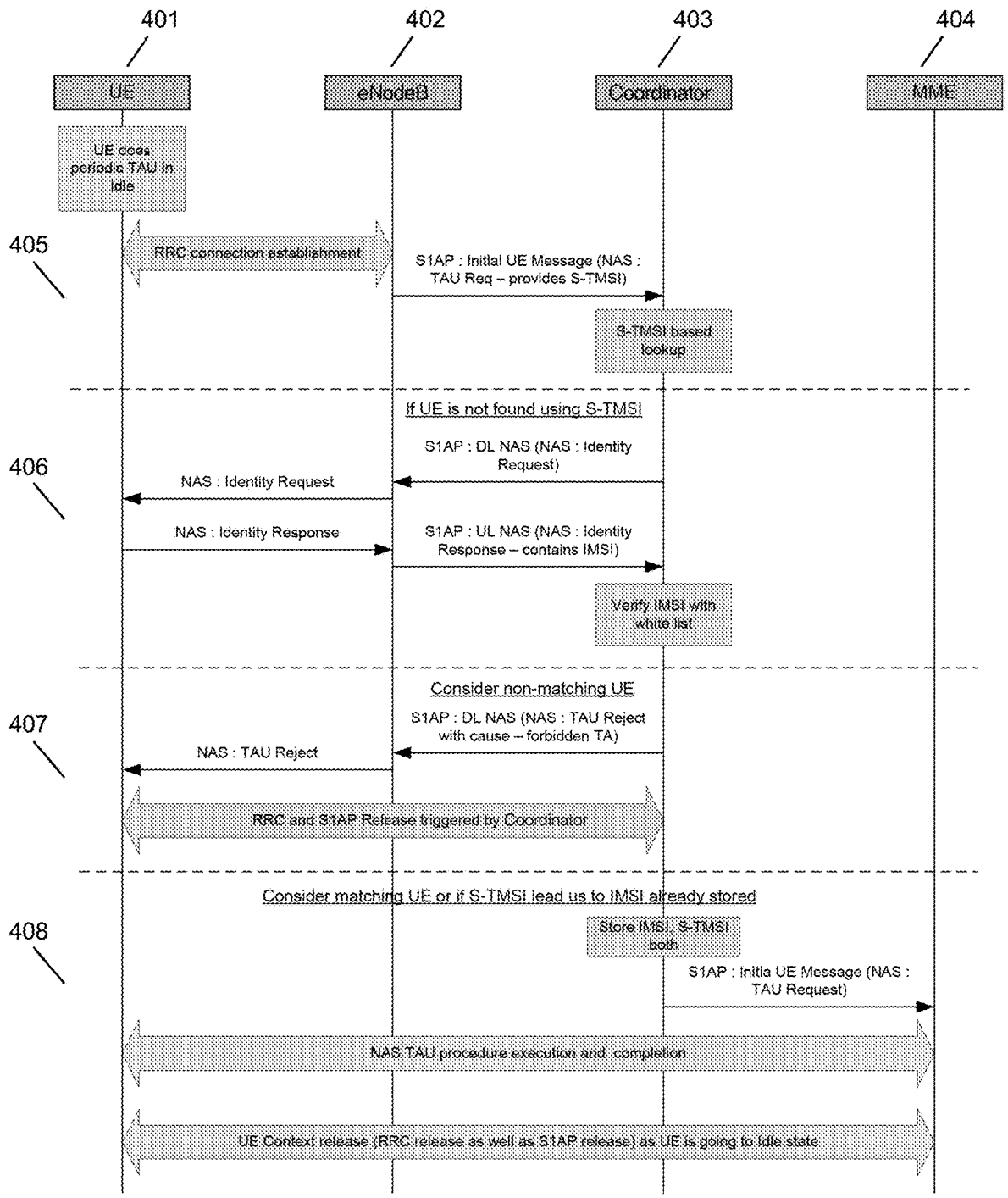
FIG. 4 is a call flow of a second S-TMSI lookup procedure, in accordance with some embodiments.

FIG. 4 is a call flow of a second S-TMSI lookup procedure, in accordance with some embodiments. Call flow 405 shows steps for handling a periodic tracking area update (TAU) from UE 401. The UE may send a connection request to eNodeB 402, which then forwards the request to coordinator 403, which performs a lookup using the S-TMSI. Call flow 406 shows steps that occur if the UE is not found using a S-TMSI lookup, namely, a NAS identity request is sent from coordinator 403 to obtain the full IMSI from the UE 401, without going to MME 404 in the core network, for matching against an IMSI whitelist. In call flow 407, if a lookup does not match with S-TMSI and still does not match with IMSI, the coordinator 403 may send a TAU reject message to the UE. In call flow 408, if the S-TMSI matches a previously-stored IMSI, the coordinator may store the IMSI and S-TMSI, and may forward the TAU request to MME 404.

Figure 5:
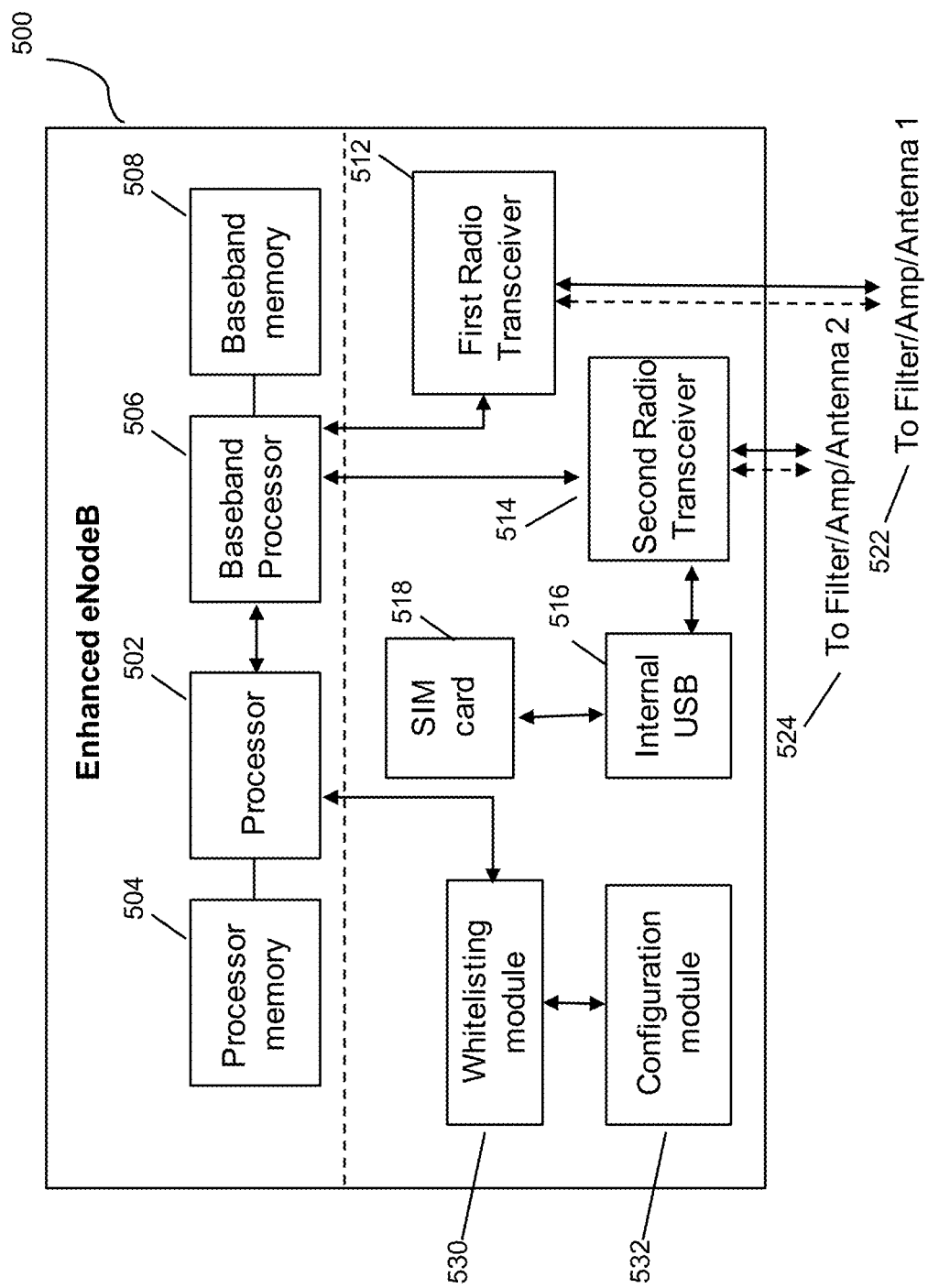
FIG. 5 is a schematic diagram of an enhanced base station, in accordance with some embodiments.

FIG. 5 is a schematic diagram of an enhanced base station, in accordance with some embodiments. Enhanced eNodeB 500 may include processor 502, processor memory 504 in communication with the processor, baseband processor 506, and baseband processor memory 508 in communication with the baseband processor. Enhanced eNodeB 500 may also include first radio transceiver 512 and second radio transceiver 514, internal universal serial bus (USB) port 516, and subscriber information module card (SIM card) 518 coupled to USB port 514. In some embodiments, the second radio transceiver 514 itself may be coupled to USB port 516, and communications from the baseband processor may be passed through USB port 516.

A whitelisting module 530 may also be included, which may include a database (not shown), in some embodiments, or which may be in communication with a coordination server (not shown), in some embodiments, or both, in some embodiments. Module 530 may perform matching, filtering, or other identification and/or authentication of a requesting UE as described herein. A configuration module 532 may be used to store IMSI-GUTI mappings, regular expressions, filters, whitelists, blacklists, and other information for use by whitelisting module 530. Configuration information in the configuration module 532 may be synchronized via a synchronization server across multiple servers or modules as required.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

The first radio transceiver 512 may be a radio transceiver capable of providing LTE eNodeB functionality, and may be capable of higher power and multi-channel OFDMA. The second radio transceiver 514 may be a radio transceiver capable of providing LTE UE functionality. Both transceivers 512 and 514 are capable of receiving and transmitting on one or more LTE bands. In some embodiments, either or both of transceivers 512 and 514 may be capable of providing both LTE eNodeB and LTE UE functionality. Transceiver 512 may be coupled to processor 502 via a Peripheral Component Interconnect-Express (PCI-E) bus, and/or via a daughtercard. As transceiver 514 is for providing LTE UE functionality, in effect emulating a user equipment, it may be connected via the same or different PCI-E bus, or by a USB bus, and may also be coupled to SIM card 518.

SIM card 518 may provide information required for authenticating the simulated UE to the evolved packet core (EPC). When no access to an operator EPC is available, a local EPC on the enhanced eNodeB itself (not shown) may be used, or another local EPC on the network may be used.

This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 510 and 512, which may be Wi-Fi 802.11a/b/g/n/ac/ad/ah, Bluetooth, ZigBee, microwave (including line-of-sight microwave), satellite, or another wireless backhaul connection. Any of the wired and wireless connections may be used for either access or backhaul, according to identified network conditions and needs, and may be under the control of processor 502 for reconfiguration.

Other elements and/or modules may also be included, such as a home eNodeB, a local gateway (LGW), or another module. Additional radio amplifiers, radio transceivers and/or wired network connections may also be included.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 512 and 514. Baseband processor 506 may also perform operations to decode signals received by transceivers 512 and 514. Baseband processor 506 may use memory 508 to perform these tasks.

Figure 6:
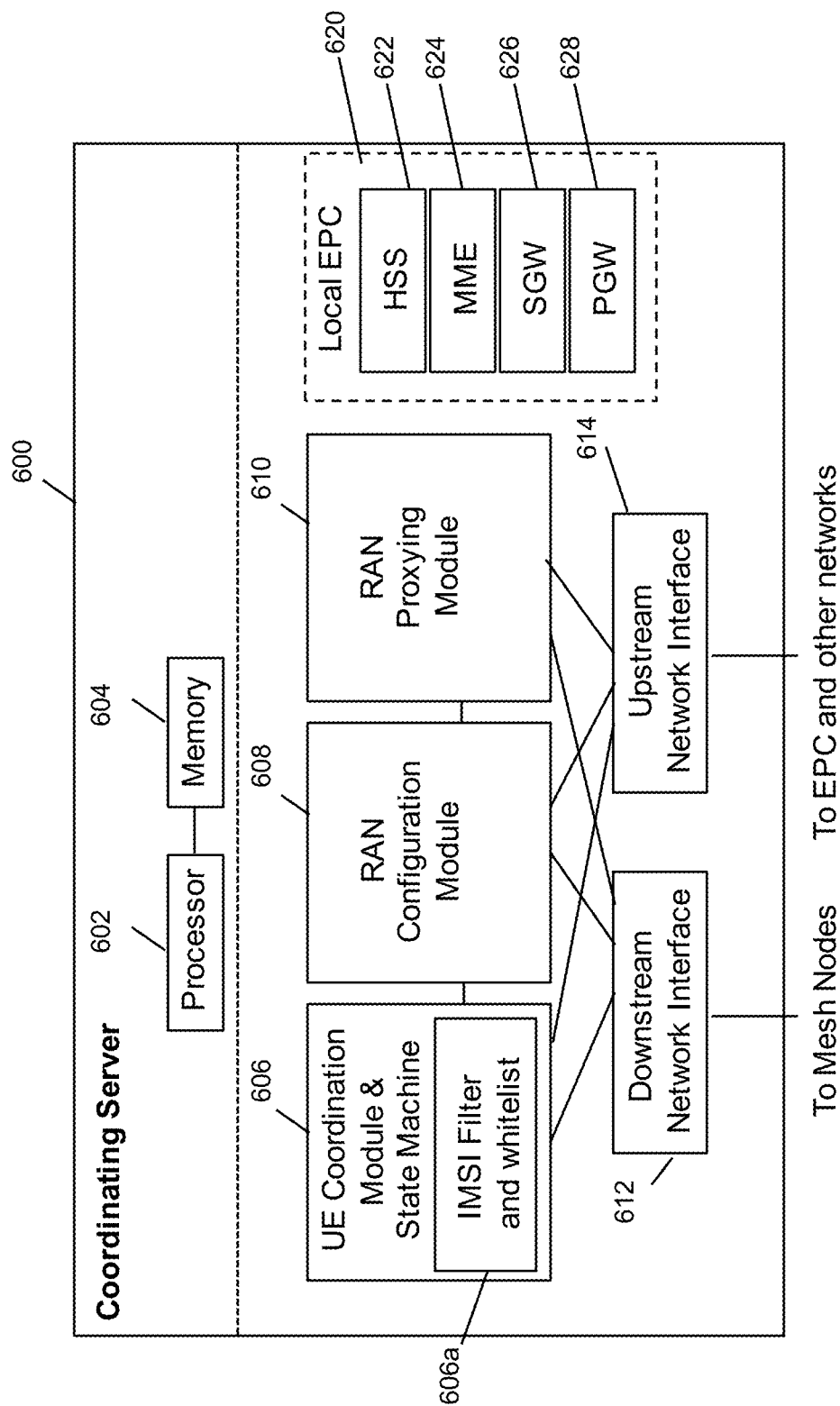
FIG. 6 is a schematic diagram of a coordination node, in accordance with some embodiments.

FIG. 6 is a schematic diagram of a coordination node, in accordance with some embodiments. Coordination node/gateway 600 includes processor 602 and memory 604, which are configured to provide the functions described herein. Also present are UE coordination module and state machine 606, which may include IMSI filter and whitelist 606a, radio access network configuration module 608, and radio access network proxying module 610. UE module 606 may use a state machine to determine how to virtualize messages to or from the UE at the coordinating node.

UE coordination module 606 may include IMSI filter 606a, which may perform whitelisting and UE identification as described herein. In some embodiments, gateway 600 may coordinate multiple RANs using coordination module 608. If multiple RANs are coordinated, a database may include information from UEs on each of the multiple RANs.

In some embodiments, gateway 600 may also provide proxying, routing virtualization and RAN virtualization, including X2, S1, and S2a proxying, via module 610. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet). Signaling storm reduction functions may be performed in module 606. In some embodiments, gateway 600 may also provide TWAG or ePDG services, using trusted wireless gateway module 610 and, in some instances, local EPC 620 and HSS 622.

In some embodiments, gateway 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

Alternatives

In some embodiments, subscriber identification information over Wi-Fi may be obtained and used. The VG will match the profiles as per given priority and stop at first match. It will then execute the rules mentioned for the matching subscriber. Note that it will not allow conflicting rules to be installed within the same profile.

In some embodiments, NAS count matching may be affected if the Identity-Response from UE (NAS) is missing. This will affect the further communication between UE and MME at every 255 messages or sooner (for service requests). In some embodiments, the VG may pass along certain information or messages, such as the UE Identity-Response message, acting as a B2BUA. In some embodiments, the VG may use known protocol messages to exit a problem state.

Where IMSI is referred to herein, other identifiers such as SIM, TMSI, GUTI should also be understood to be possible in some embodiments. In addition, per-user whitelisting based on SIM, IMSI, TMSI, GUTI, S-TMSI, or other identifiers should be permitted for allowing multiple operator core networks (MOCN). Additionally, synchronization may be provided across multiple virtualizing gateways. Additionally, the synchronization may be of the whitelist as well as the SIM, etc., information.

Identity-Based Features

Once the identity of the user is known, based on IMSI or other user identifiers, a variety of features can be provided to the user and/or to the network operator, as follows.

Whitelisting/Blacklisting

This can typically be performed at the core network. However, VG can provide a way to do it before the call reaches core network. In many situations, it is appropriate to reject a set of subscribers or allow a set of subscribers from the network attachment. Admission-control can be executed at VG now as it knows the permanent identity of the subscriber and gets the rules/policies pushed from the core network. This will help reduce the burden of the core network. Sometimes this feature is useful during the network build-up/pilot phase. A particular UE is causing MME to misbehave and which may or may not cause significant impact on the overall network. VG can block such UE from reaching the MME thus preventing the network.

In some embodiments, the whitelist will be provisioned in the VG. For field trial, we know we want to let in few UEs through VG, and these UEs may be provisioned. In some embodiments, a method may be provided to provision a large number of devices using a network connection to the VG, a configuration file, a proprietary message, or another method. In some embodiments, the VG provisioning store may be dynamic and may be kept up to date over the network. In some embodiments, the VG provisioning store may be kept in sync to within a particular time window, so that access may be granted or revoked within the time window by a remote operator. There can be multiple design approaches to store the user identity data.

In some embodiments, a blacklist may be used to block a rogue user from reaching the MME or to otherwise reject connections from certain users.

As described herein throughout this disclosure, a whitelist or blacklist may support wildcarding, open-ended matching of users and user identities, conditional matching based on substrings within a user identifier, conditional matching based on user identifier in conjunction with network conditions, matching based on a list stored at a network node, matching based on a list stored remotely, matching based on regular expressions, and/or other features.

Reducing Signaling Load

Many applications running on the UE are such that they keep transmitting few bytes of data at short intervals. In between the UE goes idle. Radio network will disconnect the UE due to inactivity and then the UE will become active again with NAS service-request and this cycle continues over and over. Every transition from Idle-to-Active and Active-to-Idle take cycles at core network elements MME and SGW. In some live networks, there has been example of certain application behavior causing too many transitions and thus network going down because of that. With permanent identity and temporary identity knowledge and relationship, VG can now relate to the NAS-Service-Request being sent by a given UE and can keep track of rate of request origination. VG can be configured to now allow service-request beyond a certain rate to flow through to the core network. So, VG can do per-UE throttling of service-requests and thus prevent meltdown of the core network.

MME Selection

In certain deployments, the requirement is that there are multiple MMEs serving the same PLMN. However, they are not part of a pool. Specific set of users may desire to access their respective MMEs. E.g. a public safety network deployment can use the existing RAN infrastructure but prefers to deploy separate core network elements. To deploy this type of network according to 3GPP specification, PLMNs served by both MMES will be separated out and the respective user SIM cards will reflect the same PLMN. But VG can remove all this complexity by providing MME selection based on the permanent identity of the user. i.e. Let MMES with same set of PLMNs connect to VG. When the call comes in from user, VG will differentiate this user based on its identity and take it to the correct MME based on that. Note that this may be performed only at the time of NAS signaling connection establishment when no GUMMEI value identifying the MME is available. Later in the life of a connection with a particular UE, when the GUMMEI/S-TMSI is available, VG need not query the user for its identity. It will connect to the right MME.

MOCN

Further, in some embodiments, access to multiple core networks or public land mobile networks (PLMNs) may be provided via the same radio access network deployment, e.g., multi-operator core network (MOCN). MOCN functionality may allow a network operator to provide access to a single radio access network by other operators. Each operator may operate its own core network, including one or more independent nodes. As an example, the billing and MME nodes may be independent for each operator. MOCN may enable non-traditional operators, such as emergency services organizations, to have their own core network services and full access control of their own cores. Each of the multiple core networks can communicate with each other as peers, in some embodiments. For example, authentication may be performed via inter-core network communication for a user who is on a roaming core network. In some embodiments, multiple cores may coordinate with each other regarding interference, backhaul, traffic prioritization, individual user authentication, and other parameters. The cores may communicate with each other via the Internet or via a peering point, such as a backhaul-connected gateway or inter-core network PGW. Multiple cores on the same cell base station hardware may communicate with each other to coordinate resources on the same base station. After retrieval from a remote core network in a MOCN network, subscriber information for one or more particular users, including authentication information, could be cached, in some embodiments, at the subscriber's current core network or at an intermediary node to help in the scenario when a user is roaming but the user's home network is disconnected or unavailable.

A particular user may be identified using its IMSI, SIM, or other network identifier as described herein, at a VG or other controller node. The VG may have a list of core networks and a mapping (e.g., whitelist) of users to core networks, and may use the mapping to determine which, if any, networks the user is permitted to access. In some embodiments the user may be sent to a default core network if not on a whitelist. Users may maintain access to particular core networks across handovers to new eNodeBs. In some embodiments, the handovers are coordinated via one or more VGs that contain user identity and whitelist functionality. The whitelists may be merged, propagated, and/or shared mutually or unilaterally among multiple VGs, in some embodiments.

In some embodiments, sharing of resources may be apportioned based on user identity. For example, if a network operator has configured its network to permit use by another operator up to a cap of 20% of available resources (e.g., access bandwidth, backhaul bandwidth, number of users, number of channels, etc.), the network operator may keep track of each user identity accessing the network, and may use the user identity information in conjunction with other information to determine whether the network usage by the other operator is within desired parameters.

In some embodiments, a network operator may provision one or more core networks within a MOCN-capable core network. The network operator may provision a whitelist or blacklist containing a list of user identities that may be permitted to use each specific core network. The provisioned list may then be pushed to one or more access gateways, such as VG gateways, which may use one or more of the methods described to identify users and to direct users to the particular core networks for which they are provisioned. Specifically, the VG may direct a user to a specific MME associated with each core network. The MMES may be unaware that they are participating in a MOCN network. In some embodiments, radio resources, including access network radio resources, and/or other network resources may be virtualized, at a VG or at another network node.

In some embodiments, multiple MOCN access networks may be joined via one or more gateways. Roaming may be permitted across the one or more MOCN networks, even if a particular core network is not specifically provisioned on a particular access network. Roaming functionality may be enabled by communication among VG servers, which may involve peer-to-peer and centralized coordination. Roaming may involve a VG involved in access first checking a local whitelist and then retrieving a remote whitelist for checking, or submitting a request for remote whitelist authentication to another server.

Tracking Operational Characteristics

When per-user tracking is available at the edge of the network, such as at a controller or VG, a number of different operational characteristics may be tracked at the edge of the network that previously could only be tracked by the network operator, and operational characteristics could additionally be tracked across operators, i.e., in a multi-operator core network (MOCN).

Operational characteristics in this section specifically refers to at least: latency; call drop rates; handover drop rates; throughput, load and utilization rates for radio spectrum, processors and/or compute resources, and backhaul and other network resources; call blocking probabilities; network outage rates; packet drop rates; link and device uptimes; network routing failures; identification of suboptimal routings; radio channel quality indicators; RSSI, EIRP, RSRP, RSRQ, or other signal strength indicators; other device health parameters, such as estimated time to failure, temperature, fan status; other SMNP parameters; other metadata collected in conjunction with these parameters, such as call drop cause information; and power usage and/or power quality indicators.

These operational characteristics could be monitored on a per-user basis, or a per-user, per-link basis, or other bases. Multiple users could be grouped for tracking. The monitoring could occur at the base station, at a controller such as a VG, or in a core network. The statistics could also be located and/or analyzed at any of these locations. When analyzed, the monitored characteristics could provide helpful and actionable information for answering questions, such as: what individual users are subject to the worst call drop rates? how is the call drop rate for this particular user? what is the no-drop rate for a given set of users? for a given set of users in a known geographic location? can we substantiate this user's complaints of poor call quality? The per-user information could be aggregated and/or anonymized over several users to obtain information for answering other questions, such as: what operational characteristics are pain points for our high-value customers? what operational characteristics have improved or deteriorated the most over a certain period of time? have, e.g., call drop rates fallen below a certain threshold for one or more high-value users? etc.

In some embodiments, a particular user may be monitored via logging and/or tracing. In some embodiments, a set of users may be monitored. In some embodiments, this set of users could be anonymous.

Probe Gateway

In some embodiments, a controller may act as an analytics gateway and probe gateway. The probe gateway may use operational parameter monitoring to enable a network operator to assess and provide analytics based on the above operational characteristics in near-real time. For example, a network operator could, in near-real time, see the operational effect of activating a particular network feature or turning on a new network tower, in the form of a real-time display of utilization rates. As another example, a network operator could monitor, in near-real time, network drops and throughput issues being experienced by a particular user or group of users, or on a particular core network or set of core networks, and could collect logging information for troubleshooting the problem. A web-based interface for this probe gateway could be implemented. The interface could be embedded into an interface for changing the operational parameters. The interface could be embedded into a monitoring system or an alarm system.

In some embodiments, a analytics gateway and probe gateway could enable an operator to select a subset of the user population and observe the operational characteristics for the subset. This may be useful for an operator desiring to find out more about high-value users, or users with a particular handset, or users with a handset supporting a particular technology. This may be enabled within a user interface, or within a network statistics gathering module at the base station or controller. The selection module could be configured remotely.

Network Adjustments

In some embodiments, identification of a particular user may cause the network to perform network adjustments, adjustments to power of one or more radios, adjustments to traffic of other UEs, and/or bandwidth allocations. In some embodiments, a particular user may be subject to application of various filters and traffic shaping rules. Any of the above operational parameters could be so adjusted. In some embodiments, information for performing network adjustments could be sent to or analyzed at a self-organizing network module. The self-organizing network module could then send instructions to one or more nodes within the network based on the analysis. In some embodiments, network adjustments could be made to, for example, reduce network drops experienced by particular users or in a particular area. In some embodiments, the self-organizing network module could set up triggers such that the detection of one or more specific users could cause a message to be sent to the network operator. In some embodiments, the self-organizing network module could send instructions to some or all network nodes to apply certain thresholds, filters, transmission power parameters, or any other network parameters at each of the network nodes when one or more specific users are detected, or to apply such parameters specifically to traffic to and/or from the one or more specific users.

Security Aspects

A VG or a LTE femto gateway is typically placed in the data center close to or same as the core network. Hence security threat on the pipe between the VG and the core network is minimal. However, to derive the identity, VG has to communicate with UE in clear on the radio interface. While that is not good, VG keeps this approach to minimum using one or more approaches described herein. In many cases, VG may be able to derive the identity by mapping the temporary identity available on the radio to the permanent identity of the user.

Per-User MOCN

In some embodiments, SIM-based identity tracking may be extended to apply individualized policies to users or sets of users. For example, each user may be treated as belonging to its own core network, and different policies may be applied to each of the users. The underlying base station and coordination server architecture could be unchanged. As a specific example, a single user or set of five to ten users may register for service at a corporate office. Each of the users at the corporate office may require connectivity to certain corporate resources via the network, but no other users on the network are to be provided access. This use case may be supported using per-user identity tracking as described herein, combined with a security policy that grants access to only the designated set of users. In some embodiments, applying policies to sets of users as granular as one user may be supported by a virtualized EPC, providing per-user MOCN capability.

In some embodiments, identity tracking may be provided as a service. In some embodiments, identity tracking may be provided at the cloud coordination server. In some embodiments, identity tracking may be provided in conjunction with a local core network or local evolved packet core (EPC), as substantially described in U.S. application Ser. No. 14/571,250, "Virtualization of the Evolved Packet Core to Create a Local EPC," hereby incorporated herein in its entirety.

In some embodiments, the combination of multiple local EPCs, each configured to provide services and policies for a set of users based on identity tracking, may be enabled. Each EPC could have various degrees of autonomy, from complete autonomy to partial autonomy. Each EPC could be instantiated based on a common set of EPC parameters, wherein the common set is any subset of the controllable policies and parameters for each EPC, and wherein the common set may be retrieved or copied from a central server. Each EPC could be enabled to communicate with other EPCs on the network, such that the EPCs could coordinate with each other to provide coverage to users on each of the EPCs without adversely affecting other network traffic, or coordinate with each other to provide service to users based on sharing of policies from other EPCs.

A use case of the multiple EPC scenario could be as follows. A local municipality may provide network services to a plurality of emergency services organizations. The emergency services organizations may share a single EPC, and may share policies and user identities, etc. The local municipality may contract with a network operator for these services, and may be required to interoperate with services offered to users of the network operator. The municipality may thus control its EPC separate from the EPC of the network operator. The municipality and the network operator may coordinate their EPCs to provide services. Multiple municipalities may have EPCs on the same network operator's network, and each EPC may have autonomy without interfering with the core operator's network.

Public Safety

Another use case for this technology is public safety. In many cases, a public safety agency may wish to provide data services to public safety personnel from the specific agency. IMSI or other identifiers, as described herein, may permit only public safety personnel to access a special core network configured for the use of the specific public safety agency, while permitting communication via gateways with other agencies, telecom operators, and the Internet. Public safety personnel may use their own private network to provide network services, such as live video streaming of disaster response efforts to other agency personnel, in a secure manner. The infrastructure for hosting such a private network could be shared by other agencies or operators, with each agency or operator managing their own whitelist of individual user SIMs/IMSIs.

Private Networks

In some embodiments, a private network could be created using the techniques herein described. The use case for such a network is as follows. A company may desire to negotiate a contract with a telecom operator to provide telecom services within the company at its own expense, using radio spectrum licensed from the telecom operator. The company may pay a licensing fee or connection fee, or both, to the telecom operator and may purchase its own equipment to provide services to its employees. The private network could operate as an equivalent of a private branch exchange (PBX) with cellular technology.

Such a private network would use one or more of the techniques described herein as follows. In some embodiments, all company employees may be issued SIM cards that are controlled by the company, or information from the individual SIM cards of the employees may be obtained by the company. The IMSIs of employees may be placed on a whitelist for enabling employees to access the private network. Other, unauthorized IMSIs may be rejected from accessing the private network, causing users with unauthorized IMSIs to attach normally to an operator network. The private network could have its own private core network. The private network could forward calls to an operator network via a peering interconnection with one or more operator networks. The private network could offer its own authorization server, such as an AAA server, or could offer its own special services, such as access to video or data storage for resources located within the corporate network. The private network could intercept requests to call other devices on the private network, and could route such calls independent of an operator core network to, for example, enable employees within the company located in different countries to call each other without going through one or more national telephone operators and coordinators.

International Operator Interconnection

Another use case for this technology is international operator interconnection, clearing and settlement services. Currently, private companies in communication with network operators in many countries provide interconnection of diverse networks and data formats between those operators and countries. These private companies also provide clearing and settlement of payment for charging users that roam internationally. A mobile operator could use the techniques herein to identify that a roaming user is from another operator in another country, and may redirect the user's phone via a direct connection to the remote operator instead of via the interconnection vendor.

2G, 3G, 4G, and 5G MOCN Networks

Network sharing and multi-operator core networks (MOCN) come in various varieties. In some embodiments, MOCN functionality at a coordinating server (HNG) enables multiple network operators to share the RAN while maintaining their own core networks. The functionality described herein allows for MOCN network sharing for multiple 2G operators, multiple 3G operators, multiple 5G operators, or any other RAT.

As well, 3GPP has standardized MOCN for a single RAT; however, since the HNG is able to interwork and virtualize among multiple different radio access technologies, the HNG can be used to enable multi-RAT MOCN, including 3G MOCN using a 4G RAN, mixed 3G and 4G MOCN, a single RAN using both a 3G and a 4G core network, and so on. In general, any RATs that are able to be virtualized by the HNG are able to use MOCN functionality to share a core network. In some embodiments, if a cellular base station having a particular RAT is able to be virtualized to support a core network of a different RAT, for example using interworking between the RATs or using a virtual base station at the HNG that provides the necessary stateful signaling towards the core and also towards the base station, that cellular base station is capable of supporting MOCN for its own RAT and also for the different RAT. For example, the HNG is able to virtualize 2G, 3G, 4G, and 5G to use a 4G core network or a 5G core network, in some embodiments. Any-G interworking, heterogeneous interworking, Any-G transcoding between technologies is supported, in some embodiments.

Active network sharing in the WCDMA domain can be achieved by Multi-Operator RAN (MORAN) or Multi-Operator Core Networks (MOCN). The difference between these two approaches lies in the frequency allocation. MORAN requires dedicated frequencies for each operator, while the entire spectrum and frequencies are shared in MOCN. MORAN requires a minimum of two WCDMA carriers, while MOCN can be deployed on a single WCDMA carrier over very narrow frequency band allocations.

MOCN provides spectral trunking gains for increased network capacity or extended coverage when a regional split deployment is carried out. Yet, the degree of service differentiation and control is lower since all the radio resources are shared. MOCN is typically used where several core network operators share the same radio network, for instance, to meet license obligations to provide rural coverage. These advantages can also be added across RATs using the present disclosure.

In some embodiments, transcoding of user data can also be performed to enable MOCN functionality to operate across RATs. In some embodiments, an architecture such as the architecture of U.S. patent application Ser. No. 15/464, 333, hereby incorporated by reference in its entirety, could be used. In some embodiments, an architecture as described in U.S. Provisional Patent Application Nos. 62/676,906, 62/804,209, 62/788,081, and/or 62/900,647, each hereby incorporated by reference in their entirety, could be used for supporting multi-RAT and 5G.

It is noteworthy that different RAN devices (cellular base stations or radio heads) have their own communication protocols, which can be proprietary. The HNG is able to interpose itself between these proprietary devices and is able to interwork them to communicate with each other and with the HNG itself, whatever the RAT supported, as a result of its use of stateful proxies and its multi-RAT interworking capabilities.

In some embodiments, SIM whitelisting could also be added to the multi-RAT MOCN functionality to enable specific SIMs to use particular core networks of another RAT.

Further Alternatives

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application.

In some embodiments, several nodes in the 4G/LTE Evolved Packet Core (EPC), including mobility management entity (MME), MME/serving gateway (S-GW), and MME/S-GW are located in a core network. Where shown in the present disclosure it is understood that an MME/S-GW is representing any combination of nodes in a core network, of whatever generation technology, as appropriate. The present disclosure contemplates a gateway node, variously described as a gateway, HetNet Gateway, multi-RAT gateway, LTE Access Controller, radio access network controller, aggregating gateway, cloud coordination server, coordinating gateway, or coordination cloud, in a gateway role and position between one or more core networks (including multiple operator core networks and core networks of heterogeneous RATs) and the radio access network (RAN). This gateway node may also provide a gateway role for the X2 protocol or other protocols among a series of base stations. The gateway node may also be a security gateway, for example, a TWAG or ePDG. The RAN shown is for use at least with an evolved universal mobile telecommunications system terrestrial radio access network (E-UTRAN) for 4G/LTE, and for 5G, and with any other combination of RATs, and is shown with multiple included base stations, which may be eNBs or may include regular eNBs, femto cells, small cells, virtual cells, virtualized cells (i.e., real cells behind a virtualization gateway), or other cellular base stations, including 3G base stations and 5G base stations (gNBs), or base stations that provide multi-RAT access in a single device, depending on context.

In the present disclosure, the words "eNB," "eNodeB," and "gNodeB" are used to refer to a cellular base station. However, one of skill in the art would appreciate that it would be possible to provide the same functionality and services to other types of base stations, as well as any equivalents, such as Home eNodeBs. In some cases Wi-Fi may be provided as a RAT, either on its own or as a component of a cellular access network via a trusted wireless access gateway (TWAG), evolved packet data network gateway (ePDG) or other gateway, which may be the same as the coordinating gateway described hereinabove.

The word "X2" herein may be understood to include X2 or also Xn or Xx, as appropriate. The gateway described herein is understood to be able to be used as a proxy, gateway, B2BUA, interworking node, interoperability node, etc. as described herein for and between X2, Xn, and/or Xx, as appropriate, as well as for any other protocol and/or any other communications between an LTE eNB, a 5G gNB (either NR, standalone or non-standalone). The gateway described herein is understood to be suitable for providing a stateful proxy that models capabilities of dual connectivity-capable handsets for when such handsets are connected to any combination of eNBs and gNBs. The gateway described herein may perform stateful interworking for master cell group (MCG), secondary cell group (SCG), other dual-connectivity scenarios, or single-connectivity scenarios.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method, comprising:
receiving, at a virtualizing gateway, a first service request from a first user equipment (UE) via a first eNodeB, wherein the virtualizing gateway is in communication with a first core network of a first mobile operator and a second core network of a second mobile operator, the first and the second core network each including a serving gateway (SGW) and a packet data network gateway (PGW);
creating, at the virtualizing gateway, an association from each of a plurality of UE identifiers to a desired core network;
applying, at the virtualizing gateway, a first filter using a first UE identifier of the first UE, based on the association;
forwarding, at the virtualizing gateway, based on the applied first filter, the first service request from the first UE to the first core network;
receiving, at the virtualizing gateway, via a second base station, a second service request from a second user equipment (UE);
applying, at the virtualizing gateway, a second filter using a second UE identifier of the second UE, based on the association; and
forwarding, at the virtualizing gateway, based on the applied second filter, the second service request from the second UE to the second core network,
wherein the virtualizing gateway is acting as a gateway between the first eNodeB and the first core network, and between the second base station and the second core network, and
wherein the second core network uses a different radio access technology (RAT) than the first core network.

2. The method of claim 1, wherein the first UE identifier is an international mobile subscriber identity (IMSI), wherein the first filter is a whitelist containing a plurality of IMSIs to be granted service or a blacklist containing a plurality of IMSIs to be denied service, wherein the first service request is a Long Term Evolution (LTE) attach request, wherein the method further comprises forwarding a message from the first UE to a first mobility management entity (MME) in the first core network, and wherein the second core network uses a 3G radio access technology.

3. The method of claim 1, further comprising sending a network access stratum (NAS) message to the first UE to request an international mobile subscriber identity (IMSI) when the IMSI is not provided by the first UE.

4. The method of claim 1, further comprising receiving a global unique temporary ID (GUTI) or a System Architecture Evolution temporary mobile subscriber identity (STMSI) from the first UE, comparing the received GUTI or S-TMSI to the plurality of UE identifiers to identify an international mobile subscriber identity (IMSI) of the first UE, and applying the first filter using the identified IMSI.

5. The method of claim 1, further comprising receiving a temporary mobile subscriber identity (TMSI), temporary logical link identity (TLLI), P-TMSI, M-TMSI, or S-TMSI from the first UE, determining an international mobile subscriber identity (IMSI) of the first UE, and determining whether to authenticate the identified first UE.

6. The method of claim 5, further comprising handling sequence number breaks in a series of messages between the first UE and the first core network by restarting a message sequence.

7. The method of claim 1, further comprising synchronizing a filter configuration from a configuration server to the virtualizing gateway.

8. The method of claim 1, further comprising providing services to a public safety agency limited to public safety personnel with subscriber identity module (SIM) cards having IMSIs that have been configured in the first filter to permit access.

9. The method of claim 1, further comprising providing services to the first UE of a mobile subscriber roaming from the first mobile operator to a second international mobile operator and having a subscriber identity module (SIM) card for the first mobile operator, the first mobile operator having a secure route to the second international mobile operator, the second international mobile operator receiving an international mobile subscriber identity (IMSI) from the mobile subscriber's first UE, the first mobile operator forwarding a message to the second international mobile operator's core network via the secure route to the second international mobile operator, the first mobile operator performing charging and settlement services through the secure route.

10. The method of claim 1, further comprising identifying a set of international mobile subscriber identities (IMSIs) using the first filter to be provided priority treatment of traffic.

11. The method of claim 1, further comprising identifying a set of international mobile subscriber identities (IMSIs) using the first filter to be provided an elevated level of logging and monitoring at the first core network, and sending a message to one of the first core network or the first eNodeB of the first UE to set the elevated logging and monitoring level.

12. The method of claim 1, further comprising providing services to the first UE within a corporate network at a base station connected within the corporate network; and
forwarding, based on the first-filter, the message from the UE via the corporate network to an operator core network to provide services to the UE from the operator core network.

13. The method of claim 1, further comprising performing per-UE throttling of service requests to the first core network.

14. The method of claim 1, further comprising blocking a rogue UE from reaching the first core network using a blacklist at the virtualizing gateway.

15. A system, comprising:
a first base station for receiving messages from a first user equipment (UE);
a second base station for receiving messages from a second user equipment (UE); and
a gateway coupled to at least one eNodeB and acting as a virtualizing gateway for communications from at least one eNodeB to one or more core networks, the one or more core networks including a serving gateway (SGW) and a packet data network gateway (PGW), the one or more core networks having at least two radio access technologies (RATs),
wherein the virtualizing gateway further comprises:
a processor; and
a memory comprising instructions that, when executed by the processor, cause the processor to perform steps including:
receiving, at the virtualizing gateway, a first service request from a first user equipment (UE) via the first base station;

creating, at the virtualizing gateway, an association from each of a plurality of UE identifiers to a desired core network;
applying, at the virtualizing gateway, a first filter using a first UE identifier of the first UE, based on the association;
forwarding, at the virtualizing gateway, the first service request from the first UE to a first core network based on the applied first filter;
receiving, at the virtualizing gateway, via the second base station, a second service request from a second user equipment (UE);
applying, at the virtualizing gateway, a second filter using a second UE identifier of the second UE, based on the association; and
forwarding, at the virtualizing gateway, the second service request from the second UE to the second core network based on the applied second filter.

16. A non-transitory computer-readable medium comprising instructions that, when executed by a processor at a virtualizing gateway, cause the virtualizing gateway to:

receive a first service request from a first user equipment (UE) via a first base station;
create an association from each of a plurality of UE identifiers to a desired core network;
apply a first filter using a first UE identifier of the first UE, based on the association;
forward the first service request from the first UE to a first core network based on the applied first filter;
receive via a second base station, a second service request from a second user equipment (UE);
apply a second filter using a second UE identifier of the second UE, based on the association;
forward the second service request from the second UE to the second core network based on the applied second filter; and
act as a gateway between at least one base station and one or more core networks,
wherein the one or more core networks support at least two radio access technologies (RATs).

* * * * *